(12) United States Patent
Chaput et al.

(10) Patent No.: US 12,208,338 B1
(45) Date of Patent: Jan. 28, 2025

(54) ANIMATED AND PERSONALIZED COACH FOR VIDEO GAMES

(71) Applicant: Electronic Arts Inc., Redwood City, CA (US)

(72) Inventors: Harold Henry Chaput, Belmont, CA (US); Mattias Teye, Sundbyberg (SE); Zebin Chen, Santa Clara, CA (US); Wei Wang, Fremont, CA (US); Ulf Erik Kristoffer Sjöö, Stockholm (SE); Ulf Martin Lucas Singh-Blom, Stockholm (SE)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 18/352,179

(22) Filed: Jul. 13, 2023

Related U.S. Application Data (63) Continuation of application No. 17/120,011, filed on Dec. 11, 2020, now Pat. No. 11,724,201.

(51) Int. Cl.
*A63F 13/58* (2014.01)
*A63F 13/215* (2014.01)
*A63F 13/35* (2014.01)
*A63F 13/424* (2014.01)
*A63F 13/795* (2014.01)
*A63F 13/798* (2014.01)
(Continued)

(52) U.S. Cl.
CPC .......... *A63F 13/798* (2014.09); *A63F 13/215* (2014.09); *A63F 13/424* (2014.09); *G06N 20/00* (2019.01); *G06T 13/40* (2013.01)

(58) Field of Classification Search
CPC .... A63F 13/5375; A63F 13/67; A63F 13/798; A63F 13/85; A63F 2300/305; A63F 2300/558; G06N 20/00; G06N 3/006; G06N 3/0454; G06N 3/08; G06F 9/453; G06T 13/40
See application file for complete search history.

(56) References Cited

U.S. PATENT DOCUMENTS

2012/0130717 A1* 5/2012 Xu .......................... G06F 3/167
345/473
2019/0095775 A1 3/2019 Lembersky
(Continued)

*Primary Examiner* — Lawrence S Galka
(74) *Attorney, Agent, or Firm* — McDermott Will & Emery LLP (57) ABSTRACT

Various aspects of the subject technology relate to systems, methods, and machine-readable media for generating insights for video games. The method includes gathering information regarding a player for a plurality of video games, the information comprising at least one of in-world state data, player action data, player progression data, and/or real-world events relevant to each video game. The method also includes tracking events in at least one video game of the plurality of video games, the events comprising an action event or a standby event. The method also includes determining that an event of the tracked events is an action event. The method also includes generating insights regarding the action event based on the information gathered regarding the player, the insights for improving the player's performance in the video game. The method also includes relaying the insights to the player to improve the player's performance in the video game.

17 Claims, 4 Drawing Sheets

(51) Int. Cl.
    *A63F 13/85*    (2014.01)
    *G06N 20/00*   (2019.01)
    *G06T 13/40*    (2011.01)

(56) References Cited

U.S. PATENT DOCUMENTS

2019/0143218 A1   5/2019   Sulakhe
2019/0329139 A1*  10/2019  Di Giacomo Toledo ....................
                                                              A63F 13/67
2020/0078676 A1   3/2020   Gunawan
2020/0324206 A1   10/2020  Yilmazcoban
2021/0402302 A1*  12/2021  Eads ................... A63F 13/5375

* cited by examiner

ANIMATED AND PERSONALIZED COACH FOR VIDEO GAMES

CROSS REFERENCE TO RELATED APPLICATIONS

This present application claims the benefit of priority under 35 U.S.C. 120 as a continuation of U.S. patent application Ser. No. 17/120,011, filed Dec. 11, 2020, now allowed, the disclosure of which is hereby incorporated by reference in its entirety for all purposes.

TECHNICAL FIELD

The present disclosure generally relates to video games, and more particularly to an animated and personalized coach for video games.

BACKGROUND

Video games come in a variety of genres that are suited for a variety of players. As a result, some players may find some video games to be easier, or more difficult, than other video games, depending on a player's preferred type of game and/or play style. While some players may readily adapt to the varying challenges of different video games on their own, other players may require additional guidance in order to fully enjoy a video game.

BRIEF SUMMARY

The subject disclosure provides for systems and methods for generating an animated and personalized coach for communicating insights for video games to a player. In an aspect, an animated coach for a video game may track events (e.g., in the game, in player actions, and/or in the real world), to give personalized advice to players. Relevant information may be gathered from a variety of sources, including, but not limited to: 1) from the in-world state of the video game, 2) from player actions and progression in the video game, and 3) from real-world events that are relevant to the video game. This information may then be synthesized using a rule-based system to generate coaching advice in the form of lines of dialog. The lines of dialog may then be synthesized into speech audio and facial animation, which are then delivered to the player as a personalized coach.

According to one embodiment of the present disclosure, a computer-implemented method for generating insights for video games is provided. The method includes gathering information regarding a player for a plurality of video games, the information comprising at least one of in-world state data, player action data, player progression data, and/or real-world events relevant to each video game. The method also includes tracking events in at least one video game of the plurality of video games, the events comprising an action event or a standby event. The method also includes determining that an event of the tracked events is an action event. The method also includes generating insights regarding the action event based on the information gathered regarding the player, the insights for improving the player's performance in the at least one video game. The method also includes relaying the insights to the player to improve the player's performance in the at least one video game.

According to one embodiment of the present disclosure, a system is provided including a processor and a memory comprising instructions stored thereon, which when executed by the processor, causes the processor to perform a method for generating insights for video games. The method includes gathering information regarding a player for a plurality of video games, the information comprising at least one of in-world state data, player action data, player progression data, and/or real-world events relevant to each video game. The method also includes tracking events in at least one video game of the plurality of video games, the events comprising an action event or a standby event. The method also includes determining that an event of the tracked events is an action event. The method also includes generating insights regarding the action event based on the information gathered regarding the player, the insights for improving the player's performance in the at least one video game. The method also includes relaying the insights to the player to improve the player's performance in the at least one video game.

According to one embodiment of the present disclosure, a non-transitory computer-readable storage medium is provided including instructions (e.g., stored sequences of instructions) that, when executed by a processor, cause the processor to perform a method for generating insights for video games. The method includes gathering information regarding a player for a plurality of video games, the information comprising at least one of in-world state data, player action data, player progression data, and/or real-world events relevant to each video game. The method also includes tracking events in at least one video game of the plurality of video games, the events comprising an action event or a standby event. The method also includes determining that an event of the tracked events is an action event. The method also includes generating insights regarding the action event based on the information gathered regarding the player, the insights for improving the player's performance in the at least one video game. The method also includes relaying the insights to the player to improve the player's performance in the at least one video game.

According to one embodiment of the present disclosure, a system is provided that includes means for storing instructions, and means for executing the stored instructions that, when executed by the means, cause the means to perform a method for generating insights for video games. The method includes gathering information regarding a player for a plurality of video games, the information comprising at least one of in-world state data, player action data, player progression data, and/or real-world events relevant to each video game. The method also includes tracking events in at least one video game of the plurality of video games, the events comprising an action event or a standby event. The method also includes determining that an event of the tracked events is an action event. The method also includes generating insights regarding the action event based on the information gathered regarding the player, the insights for improving the player's performance in the at least one video game. The method also includes relaying the insights to the player to improve the player's performance in the at least one video game.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Video games come in a variety of genres that are suited for a variety of players. As a result, some players may find some video games to be easier, or more difficult, than other video games, depending on a player's preferred type of game and/or play style. While some players may readily adapt to the varying challenges of different video games on their own, other players may require additional guidance in order to fully enjoy a video game. Therefore, there is a need for a personalized coach to help players get the most enjoyment out of their game.

The subject disclosure provides for systems and methods for generating an animated and personalized coach for communicating insights for video games to a player. In an aspect, an animated coach for a video game may track events (e.g., in the game, in player actions, and/or in the real world), to give personalized advice to players. Relevant information may be gathered from a variety of sources, including, but not limited to: 1) from the in-world state of the video game, 2) from player actions and progression in the video game, and 3) from real-world events that are relevant to the video game. This information may then be synthesized using a rule-based system to generate coaching advice in the form of lines of dialog. The lines of dialog may then be synthesized into speech audio and facial animation, which may then be delivered to the player as a personalized coach.

According to aspects, the personalized coach may be animated, and may help players get the most enjoyment out of their game by letting them know how they can play better. For example, the animated coach may offer feedback and encouragement, and may also highlight real-world events that may be explored within the video game that may interest players.

According to aspects, a rule-based system may be utilized to generate coaching dialog from in-game events, player events, and real-world events. In an implementation, lines of dialog may be synthesized and then utilized to generate an animated voice and face to deliver that dialog to somebody playing a video game. The animated coach may also provide a variety of recommendations to the player.

The disclosed system addresses a problem in traditional video games tied to computer technology, namely, the technical problem of communicating video game insights to a player. The disclosed system solves this technical problem by providing a solution also rooted in computer technology, namely, by providing for an animated and personalized coach for video games. The disclosed system also improves the functioning of the computer itself because it trains the computer to recognize and extract relevant information from player data in order to facilitate insight generation.

Figure 1:
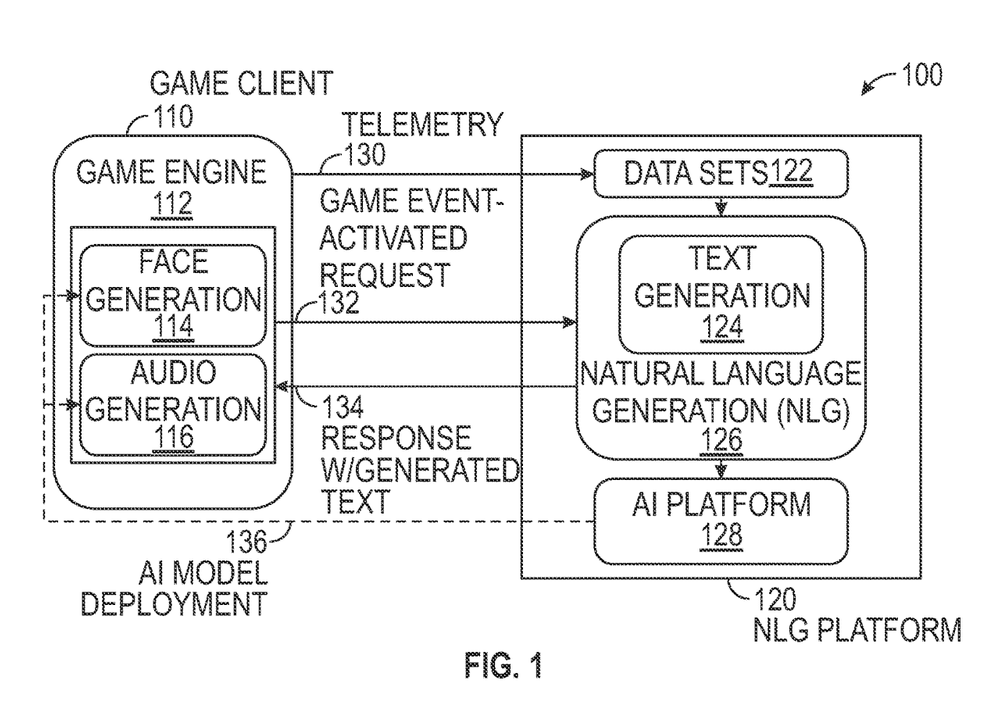
FIG. 1 illustrates an exemplary system for generating insights for video games, according to certain aspects of the present disclosure.

FIG. 1 illustrates an exemplary system 100 for generating insights for video games, according to certain aspects of the present disclosure. The system 100 may include a game client 110 coupled to a natural language generation (NLG) platform 120. The game client 110 may include a game engine 112 for executing a video game. The game engine 112 may include a face generator 114 and an audio generator 116. The NLG platform 120 may include a natural language generator 126 having a text generator 124. The NLG platform 120 may also include data sets 122 and an artificial intelligence (AI) platform 128. For example, the data sets 122 may include player data for multiple different video games.

According to aspects, the game client 110 may send telemetry data 130 to the NLG platform 120 to be stored as historical player data (e.g., to populate data sets 122). For example, the telemetry data 130 may include holistic video game data regarding the player, including, but not limited to, player statistics, contextual data (e.g., in-game maps, game modes, player roles, etc.), real-world data, etc. The game client 110 may also send game event-activated requests 132 to the natural language generator 126 of the NLG platform 120. For example, each game event-activated request 132 may be generated and sent to the NLG platform 120 in response to a trigger (e.g., an in-game trigger, etc.).

In an implementation, multiple triggers may be defined by an administrator, and/or the system 100 may be trained to automatically generate triggers, such as, for example, through machine-learning techniques.

According to aspects, once the NLG platform 120 receives the game event-activated request 132, the telemetry data 130 stored in the data sets 122 may be utilized to determine what insights are to be generated. For example, a trigger for a soccer game may be for a corner kick. In an implementation, as the player is attempting a corner kick, the game engine 112 may identify the event (i.e., the corner kick) and associate the event with the trigger. The game engine 112 may then generate and send a game event-activated request 132 to the NLG platform 120. Once the NLG platform 120 receives the game event-activated request 132 regarding the corner kick, the NLG platform 120 may pull relevant corner kick data from the data sets 122 to determine what insight may be generated for the player. For example, if the player has a history of performing poorly at corner kicks (e.g., corner kick success rate is below a threshold, below 90%, etc.), then the NLG platform 120 may utilize additional telemetry data 130 regarding the player's previous corner kicks to generate insights on how to improve their corner kick success rate. The insight(s) may then be sent to the natural language generator 126 to be converted into lines of dialogue by the text generator 124.

According to aspects, the text generator 124 may synthesize the lines of dialogue through NLG techniques. The lines of dialogue may then be stored at the AI platform 128. The AI platform 128 may include a trained model for generating speech and generating an animated coach. For example, the trained model may be deployed and stored locally 136 on the game client 110, such that rendering of the lines of dialogue into speech by an animated coach occurs through the game engine 112. For example, once the lines of dialogue are generated by the text generator 124, the NLG platform 120 may send a response with the generated text 134 (e.g., the lines of dialogue) to the game client 110. Once the generated text 134 is received by the game client 110, the game engine 112 may then execute the trained model to synthesize the animated coach through the face generator 114. The game engine 112 may also execute the trained model to synthesize the lines of dialogue into audio through the audio generator 116. The trained model 136 may also be configured to match the audio with lip movements/actions of the animated coach to improve communication of the insights to the player. For example, the face generator 114 may receive as input any output from the audio generator 116. In an implementation, the output from the audio generator 116 may be utilized by the face generator 114 to generate an animated and personalized coach. In this way, the lip movements/actions of the animated coach may be based, at least in part, on the audio from the audio generator 116.

In an aspect, an animated coach for a video game may track events (e.g., in the game, in player actions, and/or in the real world), to give personalized advice to players. The animated coach may appear and give advice to players at any time during a game session, similar to having a friend that is sitting next to the player who is also giving advice to the player. For example, the animated coach may provide in-game insights while a player is playing a game. In-game insights may include advice regarding how to improve performance in the video game, or the like. The animated coach may also provide out-of-game insights while a player is at a home screen of the game client 110. Out-of-game insights may include suggestions on other similar games that may interest a player, notifications of when a player's friends are online, or the like.

According to aspects, insights may be generated based on relevant information that is gathered from a variety of sources, including, but not limited to: 1) from the in-world state of the video game, 2) from player actions and progression in the video game, and 3) from real-world events that are relevant to the video game. For example, the relevant information may be gathered as part of the telemetry data 130, or otherwise communicated to the system 100. This information may then be synthesized using a rule-based system (e.g., by text generator 124) to generate coaching advice in the form of lines of dialog. In an implementation, a machine learning model may be trained to synthesize the information into lines of dialogue. The lines of dialog may then be synthesized into speech audio and facial animation (e.g., through the face generator 114 and the audio generator 116), which may then be delivered to the player as a personalized coach.

According to aspects, the personalized coach may be animated, and may help players get the most enjoyment out of their game by letting them know how they can play better. For example, the animated coach may offer feedback and encouragement, and may also highlight real-world events that may be explored within the video game that may interest players.

Figure 2:
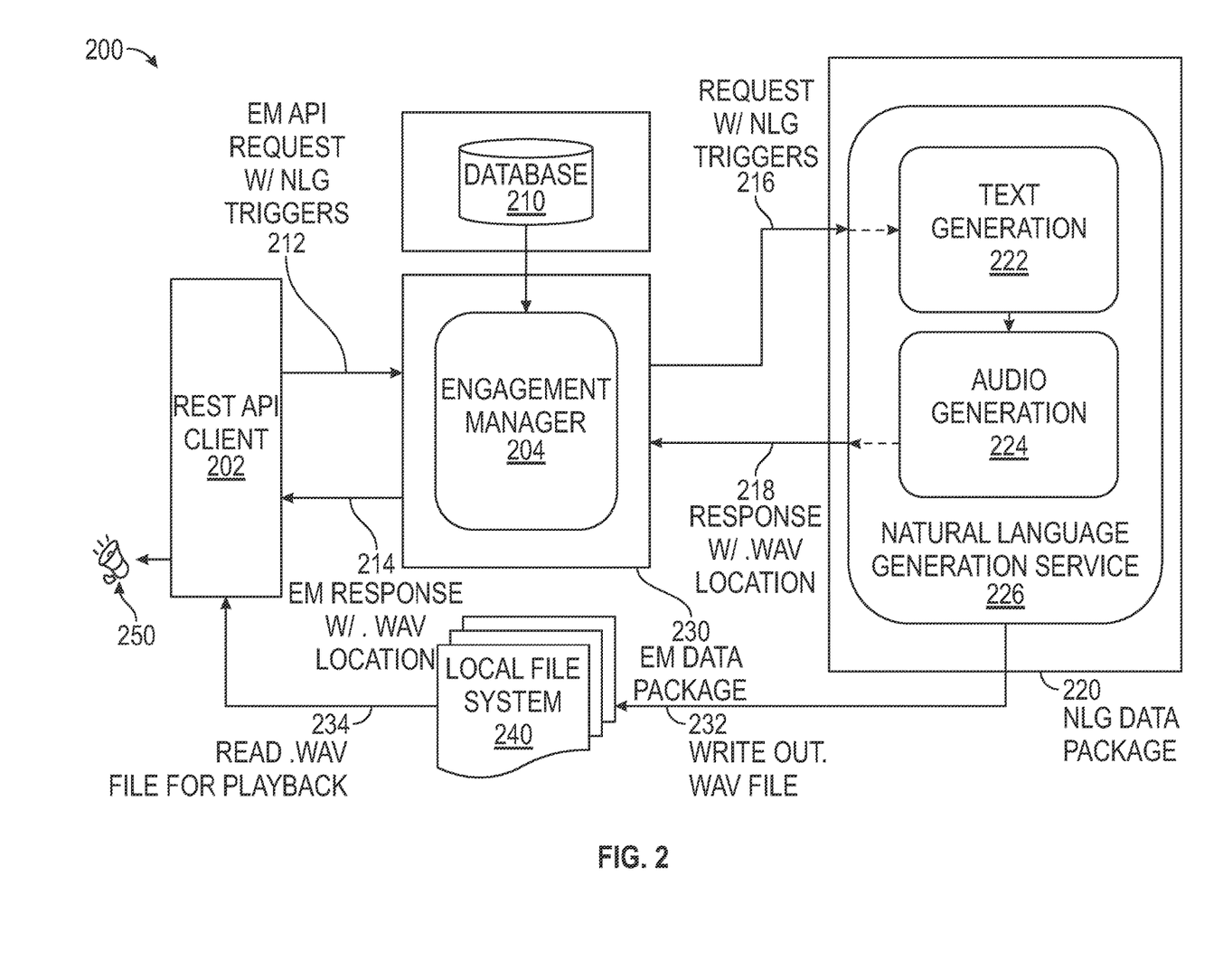
FIG. 2 illustrates an exemplary system for communicating insights for video games, according to certain aspects of the present disclosure.

FIG. 2 illustrates an exemplary system 200 for communicating insights for video games, according to certain aspects of the present disclosure. The system 200 may include an engagement manager 204 coupled to a database 210, a client API 202, and an NLG data package 220. For example, the NLG data package 220 may be generated by the NLG platform 120 of FIG. 1. The database 210 may include player data (e.g., data sets 122). The client API 202 may be coupled to the game client 110 of FIG. 1. The NLG data package 220 may also include an NLG service 226 that has a text generator 222 and an audio generator 224. The engagement manager 204 may be included in a data package 230.

According to aspects, the engagement manager 204 may monitor triggers 212 received from the client API 202 simultaneously as it considers historical player data that is stored in the database 210. For example, the triggers 212 may be for in-game situations or out-of-game situations, as described above. The engagement manager 204 may determine whether the triggers 212 relate to a stand-by event or an action event. An action event is an event that causes immediate generation of lines of dialogue for relaying to the player (e.g., "You have made every shot you've taken so far."). A stand-by event is an event that does not immediately cause generation of lines of dialogue, but rather is stored and kept track of by the engagement manager 204 for possible future reference (e.g., "For all the shots you've ever tried, you have made 40% of them.").

For example, in a soccer game, a trigger 212 associated with a corner kick may be determined to be an action event based on the fact that the player is currently attempting a corner kick and the historical player data indicates that the player has a poor corner kick percentage. The engagement manager 204 may identify that the player could utilize some insights into improving their corner kick percentage, and in response, may generate a request 216 that is sent to the NLG service 226. The NLG service 226 may then synthesize text and audio based on the request 216 (e.g., "Try putting spin on the ball."). The audio may be stored 232 in a local file system 240, which may be accessed 234 by the client API 202 to be played through an output 250 (e.g., speaker, monitor, etc.). The NLG service 226 may respond 218 to the engagement manager 204 that the audio has been generated. The engagement manager 204 may then communicate 214 to the client API 202 that the audio may be played. In this way, the engagement manager 204 is able to identify and provide a running context of the game in real-time to provide immediate assistance to the player at the right moment.

In an implementation, a missed shot may be determined to be a stand-by event by the engagement manager 204. Rather than acting on the missed shot, the engagement manager 204 may store the data in a running tally of missed/made shots. If the player continues to miss shots, the engagement manager 204 will keep track of the missed shots. The engagement manager 204 may determine after a certain number of missed shots (e.g., missed shots in a row, a percentage of missed shots, etc.) that the most recent missed shot may be an action event. The engagement manager 204 may then cause generation of the lines of dialogue by the NLG service 226, which is then relayed to the player through the animated coach.

According to aspects, the animated coach may be personalized by the player. For example, the player may customize the voice, appearance, tone, personality, etc. of the personalized coach. According to aspects, the personalized coach may include a likeness of a celebrity, an athlete, an animated character, or otherwise. In an implementation, just the audio may be generated without the animated coach. According to aspects, the insights may be customized by the player as well.

According to aspects, the following lines of dialogue may be generated in response to various situations (e.g., triggers) in a soccer game:

Player boots up the soccer game—"Welcome back [player name]!"

Player enters the home screen—"I've noticed that [soccer game] is your most played game out of all your other games with a total of X hours spent, with the second being [another game]. Your most recent match on [soccer game] was 3 days ago where you got crushed 0 to 4 against your friend, [friend's name]. Let's play a kick off match to gain some more practice."

Player selects a match to play—"I see you haven't tried [game mode] yet. Why don't you give it a shot."

While the player is selecting teams—"Try playing with your favorite club, [team name]."

Player starts the match—"To assist you in the match, I'll be analyzing your play history and providing live coaching advice during key moments in the game. Good luck!"

During kickoff—"Latest news: [team name] are playing really well under their new manager this year. Let's hope you can replicate their form in this game."

Tackle fail—"[Player name], try to stay on your feet and keep the dribbler in front of you, if you slide and miss too much your opponent is going to be getting in on goal too easily. You're currently getting beat on X % of your tackles. To improve this, I suggest trying to jockey and wait for a good opportunity to try a standing tackle to take possession of the ball!"

Goal failed because of bad shooting angle—"It's tough to score goals when you are only taking half chances. Shooting with your back to goal is a difficult skill, and will likely result in a less than accurate shot. Try to pass the ball around or dribble a defender to create opportunities where your striker is facing the net when taking a shot. If you do, the likelihood of your shot being on target will be a lot higher!"

Failed to save a penalty kick—"Saving penalty kicks is tough and a toss-up. This is why you want to avoid fouling your opponent inside the penalty box."

Opponent tackles the player—"You're losing the ball at your feet a lot. In fact, you've lost it X times. You aren't going to be very successful trying to dribble their entire team. There's no I in team. Pass the ball!"

Pass intercepted—"Your pass completion rate is X %. That's pretty low. You can't win games by passing to the other team! Try to take your time a bit more when building up the play to open up space, not every pass needs to be the killer pass."

Regain possession of the ball—"In soccer, possession is 9/10ths of the law and it's what wins games. The best defense is a good offense. It's the same with time of possession in [other sports game]. Remember how you ran down the clock in the 4th quarter yesterday against [team from the other sports game]? Keep controlling the ball and you won't give your opposition the chance to score on you!"

Goal failed because of too much power—"Ah, that's too bad. The percentage of shots that you have missed in your career due to using too much power is X %. The more you power up your shot, the higher your shot will go. Go easy on the power next time!"

Successful goal—"With that shot, you have reached an amazing milestone of scoring 100 goals life to date across 87 matches. Keep up the great work."

Opponent scores—"In your last 5 matches, you have conceded 15 goals. It's not just American football where defense win championships."

Defend a goal—"Amazing defense. [Team name] would never had been able to defend that shot in real life."

Out of bounds—"Interesting strategy. Unless you were planning on passing the ball to your teammates on the bench, I would recommend keeping the ball in play."

Opponent saves a goal—"Try the finesse shot next time to place the ball into unreachable parts of the goal. This would make it difficult for the keeper to defend the shot."

Corner kick—"You have attempted 120 corner kicks in the past with 43 of them ending with a goal. Good luck!"

Another player comes online—"Hey [player name]. Apologies for interrupting, but I thought you might like to know that your rival [Player X] has come online again. He's on a 10 match winning streak. Would you like to play a rematch and end his streak?"

As illustrated by the exemplary lines of dialogue above, the dialogue may be generated based on a variety of in-game, out-of-game, and real world information to provide a wide range of insights and suggestions to the player. Additionally, some of the dialogue may be to cheer the player on or joke with the player in order to increase player engagement.

It is understood that the lines of dialogue may be synthesized into audio that is relayed to the player through an animated coach. It is also understood that the situations and the lines of dialogue are exemplary only, and other situations from other games may similarly generate appropriate dialogue for those situations.

Figure 3:
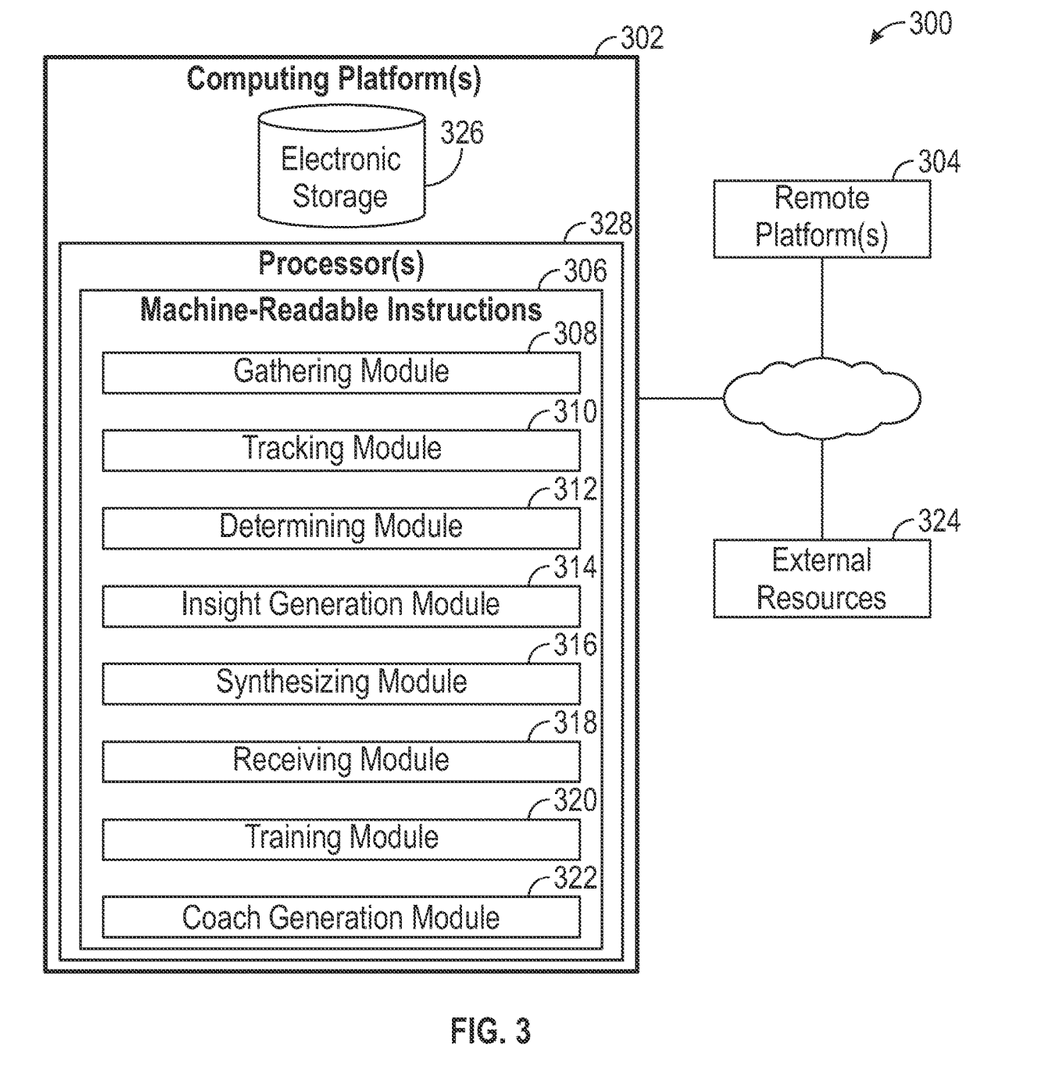
FIG. 3 illustrates a system configured for generating insights for video games, in accordance with one or more implementations.

FIG. 3 illustrates a system 300 configured for generating insights for video games, in accordance with one or more implementations. In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules. The instruction modules may include one or more of gathering module 308, tracking module 310, determining module 312, insight generation module 314, synthesizing module 316, receiving module 318, training module 320, and/or coach generation module 322, and/or other instruction modules.

Gathering module 308 may be configured to gather information regarding a player for a plurality of video games, the information comprising at least one of in-world state data, player action data, player progression data, and/or real-world events relevant to each video game.

Tracking module 310 may be configured to track events in at least one video game of the plurality of video games, the events comprising an action event or a standby event.

Determining module 312 may be configured to determine a correlation between the plurality of player statistics and the match outcomes for at least one video game of the plurality of different video games.

Insight generation module 314 may be configured to generate insights regarding the action event based on the information gathered regarding the player, the insights for improving the player's performance in the at least one video game.

Synthesizing module 316 may be configured to synthesize lines of dialogue based on the insights to the action event.

Receiving module 318 may be configured to receive customizations from the player regarding the insights.

Training module 320 may be configured to train a machine learning algorithm to identify the action events based on rules of the rule-based system.

Coach generation module 322 may be configured to generate an animated coach for relaying the insights to the player. The coach generation module 322 may also be configured to relay the insights to the player to improve the player's performance in the at least one video game.

In some implementations, computing platform(s) 302, remote platform(s) 304, and/or external resources 324 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 324 may be operatively linked via some other communication media.

A given remote platform 304 may include one or more processors configured to execute computer program modules. The computer program modules may be configured to enable an expert or user associated with the given remote platform 304 to interface with system 300 and/or external resources 324, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 324 may include sources of information outside of system 300, external entities participating with system 300, and/or other resources. In some implementations, some or all of the functionality attributed herein to external resources 324 may be provided by resources included in system 300.

Computing platform(s) 302 may include electronic storage 326, one or more processors 328, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 326 may comprise non-transitory storage media that electronically stores information. The electronic storage media of electronic storage 326 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 326 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 326 may include one or more virtual storage resources (e.g., cloud storage, a virtual private network, and/or other virtual storage resources). Electronic storage 326 may store software algorithms, information determined by processor(s) 328, information received from computing platform(s) 302, information received from remote platform(s) 304, and/or other information that enables computing platform(s) 302 to function as described herein.

Processor(s) 328 may be configured to provide information processing capabilities in computing platform(s) 302. As such, processor(s) 328 may include one or more of a digital processor, an analog processor, a digital circuit designed to process information, an analog circuit designed to process information, a state machine, and/or other mechanisms for electronically processing information. Although processor(s) 328 is shown in FIG. 3 as a single entity, this is for illustrative purposes only. In some implementations, processor(s) 328 may include a plurality of processing units. These processing units may be physically located within the same device, or processor(s) 328 may represent processing functionality of a plurality of devices operating in coordination. Processor(s) 328 may be configured to execute modules 308, 310, 312, 314, 316, 318, 320, and/or 322, and/or other modules. Processor(s) 328 may be configured to execute modules 308, 310, 312, 314, 316, 318, 320, and/or 322, and/or other modules by software, hardware, firmware, some combination of software, hardware, and/or firmware, and/or other mechanisms for configuring processing capabilities on processor(s) 328. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, 320, and/or 322 are illustrated in FIG. 3 as being implemented within a single processing unit, in implementations in which processor(s) 328 includes multiple processing units, one or more of modules 308, 310, 312, 314, 316, 318, 320, and/or 322 may be implemented remotely from the other modules. The description of the functionality provided by the different modules 308, 310, 312, 314, 316, 318, 320, and/or 322 described below is for illustrative purposes, and is not intended to be limiting, as any of modules 308, 310, 312, 314, 316, 318, 320, and/or 322 may provide more or less functionality than is described. For example, one or more of modules 308, 310, 312, 314, 316, 318, 320, and/or 322 may be eliminated, and some or all of its functionality may be provided by other ones of modules 308, 310, 312, 314, 316, 318, 320, and/or 322. As another example, processor(s) 328 may be configured to execute one or more additional modules that may perform some or all of the functionality attributed below to one of modules 308, 310, 312, 314, 316, 318, 320, and/or 322.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
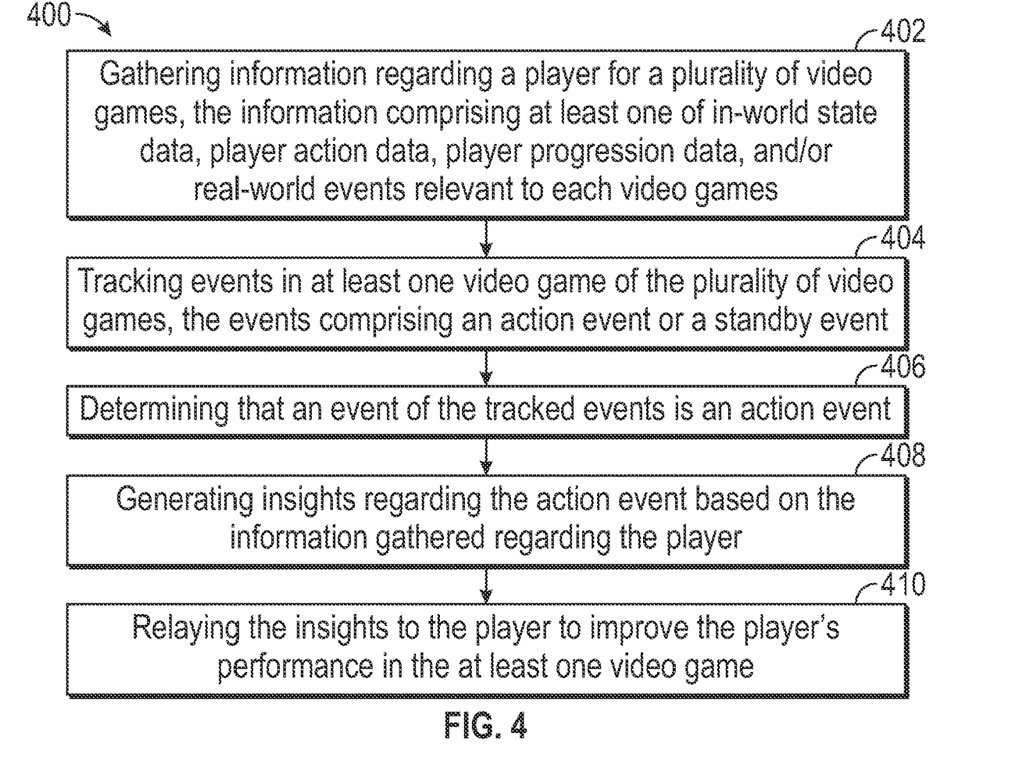
FIG. 4 illustrates an example flow diagram for generating insights for video games, according to certain aspects of the present disclosure.

FIG. 4 illustrates an example flow diagram (e.g., process 400) for generating insights for video games, according to certain aspects of the disclosure. For explanatory purposes, the example process 400 is described herein with reference to FIGS. 1-3. Further for explanatory purposes, the steps of the example process 400 are described herein as occurring in serial, or linearly. However, multiple instances of the example process 400 may occur in parallel. For purposes of explanation of the subject technology, the process 400 will be discussed in reference to FIGS. 1-3.

At step 402, information regarding a player for a plurality of video games is gathered. For example, the information may include at least one of in-world state data, player action data, player progression data, and/or real-world events relevant to each video game.

At step 404, events in at least one video game of the plurality of video games is tracked. For example, the events may include an action event or a standby event.

At step 406, an event of the tracked events is determined to be an action event.

At step 408, insights regarding the action event are generated based on the information gathered regarding the player, the insights for improving the player's performance in the at least one video game.

At step 410, the insights are relayed to the player to improve the player's performance in the at least one video game.

For example, as described above in relation to FIGS. 1-3, at step 402, information regarding a player for a plurality of video games (e.g., data sets 122, telemetry data 130) is gathered. For example, the information may include at least one of in-world state data, player action data, player progression data, and/or real-world events relevant to each video game. At step 404, events in at least one video game of the plurality of video games is tracked (e.g., by engagement manager 204). For example, the events may include an action event or a standby event. At step 406, an event of the tracked events is determined to be an action event (e.g., through determining module 312). At step 408, insights (e.g., generated text 134) regarding the action event are generated based on the information gathered regarding the player. For example, the insights may be for improving the player's performance in the at least one video game. At step 410, the insights are relayed (e.g., through output 250) to the player to improve the player's performance in the at least one video game.

According to an aspect, the process 400 may further include synthesizing lines of dialogue based on the insights to the action event, and generating speech audio and facial animation based on the lines of dialogue.

According to an aspect, the process 400 may further include receiving customizations from the player regarding the insights.

According to an aspect, the action events are determined according to a rule-based system.

According to an aspect, the process 400 may further include training a machine learning algorithm to identify the action events based on rules of the rule-based system.

According to an aspect, the insights are generated immediately with the action event.

According to an aspect, the process 400 may further include generating an animated coach for relaying the insights to the player.

Figure 5:
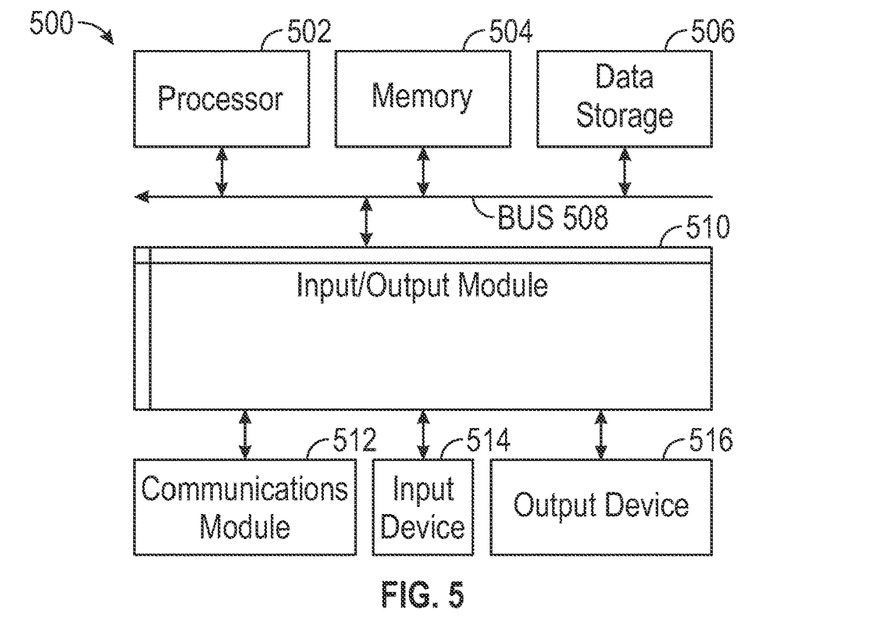
FIG. 5 is a block diagram illustrating an example computer system (e.g., representing both client and server) with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

Computer system 500 (e.g., server and/or client) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer-readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as an LCD (liquid crystal display) monitor, for displaying information to the user.

According to one aspect of the present disclosure, the above-described gaming systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 500 reads game data and provides a game, information may be read from the game data and stored in a memory device, such as the memory 504. Additionally, data from the memory 504 servers accessed via a network, the bus 508, or the data storage 506 may be read and loaded into the memory 504. Although data is described as being found in the memory 504, it will be understood that data does not have to be stored in the memory 504 and may be stored in other memory accessible to the processor 502 or distributed among several media, such as the data storage 506.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for generating insights for video games, comprising:
   gathering information regarding a player for a plurality of video games;
   tracking events in at least one video game of the plurality of video games;
   determining that an event of the tracked events is an action event;
   generating insights regarding an action event based on the information gathered regarding the player, wherein the action event is determined according to a rule-based system, wherein the insights are generated with the action event, and wherein the action event comprises a specific occurrence in the at least one video game, and
   receiving customizations from the player regarding the insights, wherein the customizations include voice, appearance, tone, or personality of a personalized coach.

2. The computer-implemented method of claim 1, further comprising:
   synthesizing lines of dialogue based on the insights to the action event; and
   generating speech audio and facial animation based on the lines of dialogue.

3. The computer-implemented method of claim 2, further comprising training a model to generate speech audio and facial animation based on the synthesized lines.

4. The computer-implemented method of claim 3, further comprising:
   training a machine learning algorithm to identify the action events based on rules of the rule-based system.

5. The computer-implemented method of claim 1, further comprising:
   relaying the insights in the form of the speech audio and a facial animation to the player to improve player performance in the at least one video game.

6. The computer-implemented method of claim 1, further comprising, generating an animated coach for relaying the insights to the player.

7. The computer-implemented method of claim 1, wherein the information comprises at least one of in-world state data, player action data, player progression data, and/or real-world events relevant to each video game.

8. A system for generating insights for video games, comprising:
   a processor; and
   a memory comprising instructions stored thereon, which when executed by the processor, causes the processor to perform:
   gathering information regarding a player for a plurality of video games;
   tracking events in at least one video game of the plurality of video games;
   determining that an event of the tracked events is an action event wherein the action event is determined according to a rule-based system;
   generating insights regarding an action event based on the information gathered regarding the player, wherein the insights are generated with the action event, and wherein the action event comprises a specific occurrence in the at least one video game and
   receiving customizations from the player regarding the insights, wherein the customizations include voice, appearance, tone, or personality of a personalized coach.

9. The system of claim 8, further comprising stored sequences of instructions, which when executed by the processor, cause the processor to perform:
   synthesizing lines of dialogue based on the insights to the action event; and
   generating speech audio and facial animation based on the lines of dialogue.

10. The system of claim 9, further comprising stored sequences of instructions, which when executed by the processor, cause the processor to perform:

training a model to generate speech audio and facial animation based on the synthesized lines.

11. The system of claim 10, further comprising stored sequences of instructions, which when executed by the processor, cause the processor to perform:
training a machine learning algorithm to identify the action events based on rules of the rule-based system.

12. The system of claim 8, further comprising stored sequences of instructions, which when executed by the processor, cause the processor to perform:
relaying the insights in the form of the speech audio and a facial animation to the player to improve player performance in the at least one video game.

13. The system of claim 8, further comprising stored sequences of instructions, which when executed by the processor, cause the processor to perform:
generating an animated coach for relaying the insights to the player.

14. A non-transitory computer-readable storage medium comprising instructions stored thereon, which when executed by one or more processors, cause the one or more processors to perform operations for generating insights for video games, the operations comprising:
gathering information regarding a player for a plurality of video games;
tracking events in at least one video game of the plurality of video games;
determining that an event of the tracked events is an action event, wherein the action event is determined according to a rule-based system;
generating insights regarding the action event based on the information gathered regarding the player, wherein the insights are generated with the action event, and wherein the action event comprises a specific occurrence in the at least one video game,
relaying the insights in the form of the speech audio and a facial animation to the player to improve player performance in the at least one video game; and
receiving customizations from the player regarding the insights, wherein the customizations include voice, appearance, tone, or personality of a personalized coach.

15. The non-transitory computer-readable storage medium of claim 14, further comprising instructions stored thereon, which when executed by one or more processors, cause the one or more processors to perform operations comprising:
synthesizing lines of dialogue based on the insights to the action event; and
generating speech audio and facial animation based on the lines of dialogue.

16. The non-transitory computer-readable storage medium of claim 15, further comprising instructions stored thereon, which when executed by one or more processors, cause the one or more processors to perform operations comprising: training a model to generate speech audio and facial animation based on the synthesized lines.

17. The non-transitory computer-readable storage medium of claim 14, further comprising, generating an animated coach for relaying the insights to the player.

* * * * *